United States Patent Office

3,471,307
Patented Oct. 7, 1969

3,471,307
SYNTHETIC MARBLE
David Rostoker, Painted Post, N.Y., assignor to Corning Glass Works, Corning, N.Y., a corporation of New York
No Drawing. Filed Aug. 7, 1967, Ser. No. 658,612
Int. Cl. C09k 3/00; C09d 1/00
U.S. Cl. 106—286                     8 Claims

---

ABSTRACT OF THE DISCLOSURE

This invention relates to the addition of a fluoride flux to particulate calcium carbonate; thereby allowing the use of slip casting techniques to form a green body, which is subsequently sintered to produce a synthetic marble article.

---

Background of the invention

Since ancient times, marble has been extensively used by man for building and ornamental purposes because of its great beauty, long durability, and varieties of colors. For purposes of classification, there are two general groups of marbles; the calcite marbles which are almost pure calcium carbonate and the dolomite marbles which contain a high percent of magnesium carbonate. The term marble is applied commercially to either rock if it is capable of taking a polish.

Natural marbles are metamorphic rocks formed essentially from the recrystallization of limestone. In nature, limestone may become plastic under elevated pressures and high temperatures and, over a long time interval, this plastic material subsequently solidifies and recrystallizes. However, marble being a product of nature is commonly inhomogeneous and may possess fractures and impurities that impair its dimensional stability. Marble can be cut and shaped to alter its physical appearance, but its physical properties like its great beauty, are often nonuniform and unpredictable.

It has been known for many years that marble may be deformed plastically under high confining pressure and at room temperature. Research has been conducted on the mechanism of marble deformation by D. T. Griggs et al., and reported in a chapter entitled, Annealing Recrystallization in Calcite Crystals and Aggregates, Rock Deformation, Geological Society of America Memoir 79, pages 21–38. The behavior of calcite and marble at temperatures of several hundred degrees and confining pressures of a few thousand atmospheres has been suggested to be similar to that of a ductile metal at atmospheric pressure. Griggs deformed powdered marble at room temperature to a degree where strain hardening occurred. Such deformation at temperatures low enough to permit noticeable strain hardening without recrystallization is similar to metallurgical "cold working," as contrasted with "hot working" at temperatures high enough for new crystals to nucleate at the expense of the strained crystals. He subsequently heated the deformed material to a point of annealing recrystallization. It was also demonstrated that recrystallization due to shear strain designated as "syntectonic recrystallization," produced a fabric of highly preferred orientation. In these experiments Griggs used pressures of 5 kilobars (72,000 p.s.i.) or greater for most of his work. Unfortunately, the conditions necessary to produce Grigg's product are not commercially practical.

In the co-pending application of D. Rostoker entitled "Synthetic Marble," Ser. No. 502,573, filed Oct. 22, 1965, there is described a method of making a synthetic marble product, which is capable of taking a polish, by grinding calcite having a minimum purity of 98% calcium carbonate to a particle size of less than 325 mesh and pressing the calcite particles in a carbon dioxide atmosphere at a temperature of 775 to 1,000° C. and at a pressure of 1,000 to 3,000 p.s.i. for a time of 10 to 120 minutes to form a coherent body. According to that method it was possible to form a marble body at pressures previously thought not to be possible. However, at the high temperatures required, it was necessary to use relatively expensive forming equipment, such as molybdenum alloy and nickel alloy dies, during the pressing operation. These materials tended to be highly reactive under the operating conditions with the calcium carbonate being pressed and consequently the dies had to be treated frequently with a protective coating.

In the next filed co-pending application of D. Rostoker and E. Bush entitled "Improved Method of Forming a Synthetic Marble," Ser. No. 56,265, filed Nov. 3, 1965, there is described a method of making an improved synthetic marble product. This method comprises pressing a substantially homogeneous particulate mixture of calcium carbonate and an effective amount of alkali metal carbonate additive selected from the group consisting of lithium carbonate, sodium carbonate, potassium carbonate, and mixtures thereof. In general, from 0.5 to 1.5 percent by weight of the additive is mixed with the calcium carbonate. The additive has allowed the temperature at which the marble is formed to be reduced from between 775°–1000° C. to between 500°–600° C., with the pressing forces and times remaining the same. Thus, less expensive die materials, such as stainless steel, were used and the cost of making synthetic marble was substantially reduced.

However, the cost of making synthetic marble was still quite high and before true commercial use could be made of this product it was necessary to reduce the cost still further. The one major area in which the cost could be reduced would be to eliminate, if at all possible, the hot pressing operation and substitute less expensive forming and sintering operations.

There are several techniques, other than hot pressing, for converting particulate materials into bodies. Those other techniques can be thought of as comprising two elements: first, forming the powder into a green body and second, sintering the thus formed green body. Forming of the green body can be accomplished in any one of the following ways: dry pressing, isostatic pressing, or slip casting. The materials, which may be formed and sintered, rather than pressed, must be capable of being compacted so that the individual powder particles, or grains, are in intimate contact; the materials must also be sufficiently reactive so that the grains which are in contact will sinter, or fuse, together. Until now, when attempting to form synthetic marble, the only way by which this contact and sintering action could be assured was to hot press at very high temperatures and pressures. The two cited co-pending applications provided successive reductions in the forming temperatures and pressures, by utilizing a $CO_2$ atmosphere and by utilizing various alkali metal carbonate fluxes. However, the problem of economically manufacturing synthetic marble still remained.

Summary of the invention

I have found that by using fluxes other than the alkali metal carbonates, particularly mixtures of various fluoride compounds, I can achieve greater fluxing action and still further reduce the various pressing parameters. However, most surprisingly, I have found that by utilizing fluoride fluxes I can now use other forming and and sintering techniques. Thus, I am now able to form a green body in one of several ways, then sinter that body and produce a synthetic marble article having properties at least equivalent to those of the synthetic marble produced by hot pressing; in addition thereto, I have significantly reduced the cost of manufacture. I can now produce synthetic marble by utilizing slip casting techniques which are the least expensive and one of the most versatile methods of producing green ceramic bodies. Slip casting has allowed me to embed metal anchors and similar fastening devices in the body, which could not be done when the body was hot pressed. This reduces the problems of fastening marble panels to walls, etc., since the panel can now be fastened directly without the need for complex support frames. Another advantage, which arises from the utilization of slip casting, is that the synthetic marble product is sufficiently porous that it may be impregnated with various silicones, and thereby be made waterproof.

I believe the reason that these other forming and sintering techniques can be used is that an unusually active fluxing action takes place between the fluorides and the calcium carbonate. However, the exact mechanism by which this occurs has not been completely characterized.

There are several conditions each of which must be fully met in order to have a truly operative invention. First, the sintering must take place at a temperature below the calcination temperature. The calcination temperature is that temperature at which calcium carbonate will decompose to calcium oxide and carbon dioxide. The calcination temperature may be controlled somewhat by additions of carbon dioxide to the furnace atmosphere. Second, the fluxes which are used must be insoluble in water. The marble, in general, will be used either as an exterior building cladding or as an interior decoration and as such it will frequently come in contact with water, for example, during cleaning operations, rain, or just due to the humidity in the air. Hence, if the fluxes are soluble, they will be removed and the surface and bonding of the marble will be deleteriously affected. Next, if the marble is to be slip cast in an aqueous slip, the fluxes cannot be soluble in water, since there will be great difficulty in controlling the slip and the resultant marble. Lastly, the flux ion which is used should be colorless because white marble usually is the desired product. If colored marble is desired, a colored ion may be used; however, this ion must meet the other aforementioned requirements.

Description of the preferred embodiment

I have found that lithium fluoride (LiF) is sufficiently active as a flux to induce grain boundary melting and thus cause the necessary sintereding so as to form synthetic marble. Furthermore, lithium fluoride is sufficiently insoluble in water that it does not deleteriously affect the final body. However, lithium fluoride melts at 842° C. which is approximately 150° above the initial calcination temperature of the calcium carbonate, in an air atmosphere at standard pressure. Therefore, it was necessary to add a second fluoride compound to the lithium fluoride so as to reduce the temperature at which the fluoride flux would melt and induce the grain boundary melting. This second fluoride material must meet the same requirements as the lithium fluoride with respect to temperature, solubility, slip casting, and coloring. I have found that I can mix various amounts of zinc fluoride ($ZnF_2$) with the lithium fluoride (LiF), and reduce the melting temperature of the lithium fluoride-zinc fluoride mixture to a temperature below the calcination temperature. I have found that it is most advantageous to use a eutectic mixture of these two materials since it has the lowest melting temperature. Furthermore, I can sinter at a temperature sufficiently far below the calcination temperature so as not to be concerned with loss of $CO_2$. The eutectic composition of the fluoride mixture is 21 weight percent lithium fluoride and 79 weight percent zinc fluoride. This lithium fluoride-zinc fluoride eutectic is particularly effective when utilizing an organic slip casting technique which uses a 7 percent fish oil and the balance toluene slip. Although the zinc fluoride is the preferred additive, lead fluoride, manganese fluoride, chromium fluoride, or aluminum fluoride may be used with this organic slip casting. Due to handling and manufacturing difficulties, it is often preferred that an aqueous slip casting technique be utilized. Since zinc fluoride is soluble in water, it could not be used with the aqueous slip casting technique and a substitute had to be found. I have discovered that an aluminum fluoride-calcium fluoride mixture will work almost as effectively with the aqueous slip casting technique as the zinc fluoride will work with the organic slip casting technique. The lead fluoride, manganese fluoride, and chromium fluoride materials may also be utilized with lithium fluoride in the aqueous slip casting method. However, they are not as desirable as the aluminum fluoride-calcium fluoride mixture.

Generally, two percent by weight of the fluoride flux mixture is the maximum amount that can be used with this process. If more than two percent is used a bloating or gas evolution problem will occur, it is not certain whether it is carbon dioxide or a fluoride gas which is being evolved, but it is certain that two percent by weight is a maximum amount of fluoride that can be utilized. The minimum amount of fluoride which can be used is about 0.25 percent and this is related to problems of mixing and dispersion of the flux in the particualte calcium carbonate. Improper dispersion will cause inadequate or inhomogeneous sintering. This minimum amount of flux has been established empirically and is related to the size of the batch, the type of mixing equipment, and other similar parameters. If more efficient methods of mixing are found, perhaps the 0.25 percent flux can be reduced.

The time necessary for the sintering action to occur has been generally found to be equivalent to the time necessary for the entire body to reach the minimum sintering temperature. Thus, a thin body will sinter throughout much more rapidly than the body having a heavier section. If the body is held at the sintering temperature for too long a length of time after the sintering should have occurred, there will be a problem of gas evolution quite similar to that encountered when more than two percent flux is used. However, in all commercially practical cases, we have not encountered the problem of gas evolution. In general, this gas evolution occurs when the time at temperature is over 4 hours longer than necessary.

Many other fluorides were attempted to be substituted for the lithium fluoride; one such group was the alkali metal fluorides which were found to be too soluble. The alkali earth metal fluorides were found not to meet the necessary requirements for a good product, because, although they were in general insoluble in water, they had too high a melting point and could not be combined with another fluoride compound to reduce the melting temperature to one at which calcination would not occur. The materials which were tried in that group were magnesium fluoride ($MgF_2$), calcium fluoride ($CaF_2$), strontium fluoride ($SrF_2$), and barium fluoride ($BaF_2$). The following is a list of miscellaneous fluoride materials which were also tried as a substitute for lithium fluoride and were found to be undesirable for the indicated reason:

| Material: | Reason |
| --- | --- |
| (1) Copper fluoride ($CuF_2$) | Soluble in water. |
| (2) Silver fluoride (AgF) | Do. |
| (3) Cadmium fluoride ($CdF_2$) | Do. |
| (4) Mercury fluoride ($Hg_2F_2$) | Decomposes. |
| (5) Tin fluoride ($SnF_4$) | Very soluble and decomposes in water. |

In addition to the aforementioned compounds, various complexes of fluorides were tested. The following is a list of those complexes and the problems associated therewith:

| Material: | Reason |
|---|---|
| (1) $2NaF \cdot AlF_3$ | Soluble in water. |
| (2) $MgF_2 \cdot LiF$ | Produces a colored marble. |
| (3) $2KF \cdot AlF_3 \cdot H_2O$ | Do. |
| (4) $CaF_2 \cdot MgF_2 \cdot LiF$ | Do. |
| (5) $CaF_2 \cdot MgF_2 \cdot LiF \cdot NaF$ | Do. |
| (6) $MgF_2 \cdot CaF_2 \cdot NaF$ | Do. |

The following examples will better illustrate my invention.

Example I

Eight kilograms of ground marble (less than 400 mesh) were dry mixed with two kilograms of ground marble (less than 50 mesh) which in turn was mixed with 50 grams of the eutectic lithium fluoride-zinc fluoride mixture. This dry batch was then added to 1300 grams of toluene to which 100 grams of fish oil was then added. The slurry was then thoroughly mixed and cast into 12″ x 12″ x 1″ molds made from asbestos cement. The casing was allowed to set for 4 hours, dry in a 70° C. oven overnight, and was fired in a ceramic kiln at 650° C. for 1 hour. The body was then cooled to room temperature and found to have a modulus of rupture of 3000 p.s.i. and compressive strength of 18,000 p.s.i. The body was then readily polished to give the high gloss which is expected of marble.

Example II

A casting having the same composition as that of Example I was made in the same manner as in Example I. The casting was allowed to set for 4 hours, dry in a 70° C. oven overnight, and was fired in a ceramic kiln at 750° C. for 1 hour. The kiln had an air and $CO_2$ atmosphere to prevent calcination. The resultant body was cooled and found to have the same properties and characteristics as the body of Example I.

Example III

A casting having the same composition as that of Example I was made in the same manner as in Example I. The casting was allowed to set for 4 hours, dry in a 70° C. oven overnight, and was fired in a ceramic kiln at 550° C. for 1 hour. The resultant body was cooled and found to have the same characteristics and properties as the body of Example I.

Example IV

Eight kilograms of ground marble (less than 400 mesh) were mixed with two kilograms of ground marble (less than 50 mesh) which in turn was mixed with 50 grams of a 35 mole percent lithium fluoride-65 mole percent zinc fluoride mixture. This batch was mixed with a slip, cast, and allowed to set, dried and fired as in Example II. The resultant body had the same characteristics and properties as the body of Example II.

Example V

Eight kilograms of ground marble (less than 400 mesh) were mixed with two kilograms of ground marble (less than 50 mesh) which in turn was mixed with 50 grams of a 75 mole percent lithium fluoride-25 mole percent zinc fluoride mixture. This batch was mixed with a slip, cast, allowed to set, dried and fired as in Example II. The resultant body had the same characteristics and properties as the body of Example II.

Example VI 2800 grams of 40 to 200 mesh and 5200 grams of sub 400 mesh calcium carbonate were dry mixed with 20 grams aluminum fluoride, 20 grams calcium fluoride, 20 grams of lithium fluoride, and 20 grams of sodium silicate. Next, 50 milliliters of a commercial deflocculant known as Darvin C were mixed with 1000 milliliters of water. The dry batch was then mixed with the Darvan C and water in a container which was partially evacuated for approximately 8 to 16 hours. This mixture was then slip cast in a 12″ x 12″ x 1¾″ pallite or plaster mold. The mold and its contents were allowed to air dry for approximately 3 to 4 hours and thereafter the casting was removed from the mold and allowed to dry for an additional 16 hours at about 85° C. The casting was then fired in a furnace to 700° C. for about 30 minutes, and $CO_2$ was introduced into the kiln above 600° C. The resultant body was then cooled and found to have the same characteristics and properties as the body of Example I.

Example VII

A casting of the same composition as Example II was made in the same manner as in Example VI. The casting was then allowed to dry and was then fired at 750° C. for about 30 minutes. $CO_2$ was introduced into the furnace at 600° C. The resultant body was cooled and found to have the same properties and characteristics as the body of Example VI.

Example VIII

A casting of the same composition as in Example VI was made in the same manner as in Example VI. The casting was allowed to dry and was then fired at 550° C. for about 30 minutes. The resultant body was cooled and found to have the same properties and characteristics as the body of Example VI.

Although only a mixture of ⅓ lithium fluoride-⅓ aluminum fluoride-⅓ calcium fluoride is shown in the examples, many other combinations are possible. The phase diagram for the system has not been established; therefore, there is no way of determining the minimum melting combination without trial and error. On the other hand, any combination which melts below the calcination temperature may be used.

I claim:
1. A method of making a synthetic marble product, which is capable of taking a polish, comprising the steps of:
  (A) forming a green body from a homogeneous particulate mixture consisting essentially, on a weight percent basis, of
    (i) from about 98.0 to 99.75% calcium carbonate; and
    (ii) from about 2.0 to 0.25% of a fluoride flux, which consists essentially of lithium fluoride and at least one additional fluoride compound selected from the group consisting of zinc fluoride, lead fluoride, manganese fluoride, chromium fluoride, aluminum fluoride, and calcium fluoride; and
  (B) sintering the green body at a temperature in the range of above about 500° C. and below the calcination temperature of the calcium carbonate.
2. The method of claim 1 wherein the green body is formed by slip casting techniques.
3. The method of claim 2 wherein:
  (a) the green body is formed by organic slip casting techniques; and
  (b) the fluoride flux consists essentially of a mixture of lithium fluoride and zinc fluoride.
4. The method of claim 3 wherein said fluoride flux consists essentially of an eutectic mixture of lithium fluoride and zinc fluoride.
5. The method of claim 2 wherein:
  (a) the green body is formed by an aqueous slip casting technique; and
  (b) the fluoride flux consists essentially of a mixture of lithium fluoride, calcium fluoride, and aluminum fluoride.

6. The method of claim 5 wherein said fluoride flux consists essentially of a mixture of, equal parts by weight of, lithium fluoride, aluminum fluoride, and calcium fluoride.

7. The method of claim 1 wherein said green body is sintered at a temperature between 600° C. and 750° C.

8. A synthetic marble product which is capable of taking a polish consisting essentially of from 98.0 to 99.75 weight percent calcium carbonate and from 2.0 to 0.25 weight percent fluoride flux which flux consists essentially of lithium fluoride and at least one additional fluoride compound selected from the group consisting of zinc fluoride, lead fluoride, manganese fluoride, chromium fluoride, aluminum fluoride, and calcium fluoride.

References Cited

UNITED STATES PATENTS

| 3,394,021 | 7/1968 | Bush et al. | 106—286 |
| 3,179,493 | 4/1965 | Diekmann et al. | 23—66 |

JULIUS FROME, Primary Examiner

T. MORRIS, Assistant Examiner

U.S. Cl. X.R.

264—56, 125